US012582275B2

(12) United States Patent
Hyun et al.

(10) Patent No.: US 12,582,275 B2
(45) Date of Patent: Mar. 24, 2026

(54) CLEANER

(71) Applicant: LG Electronics Inc., Seoul (KR)

(72) Inventors: Kietak Hyun, Seoul (KR); Hwang Kim, Seoul (KR); Jungmin Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 18/256,493

(22) PCT Filed: Aug. 27, 2021

(86) PCT No.: PCT/KR2021/011492
§ 371 (c)(1),
(2) Date: Jun. 8, 2023

(87) PCT Pub. No.: WO2022/131481
PCT Pub. Date: Jun. 23, 2022

(65) Prior Publication Data

US 2024/0023774 A1 Jan. 25, 2024

(30) Foreign Application Priority Data

Dec. 17, 2020 (KR) ........................ 10-2020-0177676

(51) Int. Cl.
*A47L 5/24* (2006.01)
*A47L 9/12* (2006.01)
(Continued)

(52) U.S. Cl.
CPC ............... *A47L 9/1666* (2013.01); *A47L 5/24* (2013.01); *A47L 9/122* (2013.01); *A47L 9/127* (2013.01);
(Continued)

(58) Field of Classification Search
CPC ..... A47L 5/24; A47L 5/28; A47L 9/16; A47L 9/1608
See application file for complete search history.

(56) References Cited

U.S. PATENT DOCUMENTS 9,433,332 B2 * 9/2016 Conrad .................. A47L 5/225
2017/0196419 A1 * 7/2017 Brown ...................... A47L 7/00
(Continued)

FOREIGN PATENT DOCUMENTS

JP 2012-071171 4/2012
JP 2013-022547 A 2/2013
(Continued)

OTHER PUBLICATIONS

International Search Report and Written Opinion in International Appln. No. PCT/KR2021/011492, mailed on Dec. 2, 2021, 18 pages (with English translation).
(Continued)

*Primary Examiner* — Michael D Jennings
(74) *Attorney, Agent, or Firm* — Fish & Richardson P.C.

(57) ABSTRACT

The present disclosure relates to a cleaner including: a cyclone part of which one side has an inlet formed therein and the other side has an outlet formed therein; a housing which is connected to the cyclone part; a motor unit which is disposed in the housing, of which one side has a suction inlet formed therein that sucks air from the cyclone part, and of which the other side has a discharge port formed therein that discharges the air to the outside; and a filter which is disposed in the housing, of which one side covers the outlet of the cyclone part, and of which the other side covers the suction inlet of the motor unit. The filter includes: a first surface extending from a front to a left rear thereof; and a second surface extending from a front to a right rear thereof. Accordingly, it is possible to reduce pressure loss of the air that has passed through the filter, and a filtration perfor-
(Continued)

mance can be obtained. Also, dust bins of various sizes can be variably installed.

21 Claims, 9 Drawing Sheets

(51) Int. Cl.

| | |
|---|---|
| ***A47L 9/16*** | (2006.01) |
| ***A47L 9/22*** | (2006.01) |
| ***A47L 9/28*** | (2006.01) |
| ***A47L 9/32*** | (2006.01) |
| ***B04C 9/00*** | (2006.01) |

(52) U.S. Cl.
CPC .......... *A47L 9/1608* (2013.01); *A47L 9/1641* (2013.01); *A47L 9/22* (2013.01); *A47L 9/2884* (2013.01); *A47L 9/322* (2013.01); *B04C 9/00* (2013.01); *B04C 2009/002* (2013.01); *B04C 2009/005* (2013.01)

(56) References Cited

U.S. PATENT DOCUMENTS

| | | | | |
|---|---|---|---|---|
| 2017/0290476 | A1 | 10/2017 | Conrad | |
| 2019/0008343 | A1* | 1/2019 | Conrad | A47L 9/246 |
| 2019/0216280 | A1* | 7/2019 | Conrad | A47L 9/1633 |
| 2019/0274502 | A1 | 9/2019 | Hulli | |
| 2020/0163503 | A1* | 5/2020 | Conrad | A47L 9/2889 |
| 2020/0324302 | A1 | 10/2020 | Conrad | |
| 2021/0259493 | A1* | 8/2021 | Her | A47L 9/19 |

FOREIGN PATENT DOCUMENTS

| | | |
|---|---|---|
| JP | 2014-079456 | 5/2014 |
| KR | 10-2019-0018532 | 2/2019 |
| KR | 10-2020-0013030 A | 2/2020 |

OTHER PUBLICATIONS

Extended European Search Report in European Appln. No. 21906786.5, mailed on Jun. 16, 2025, 7 pages.
Office Action in Korean Appln. No. 10-2020-0177676, mailed on Dec. 16, 2025, 16 pages (with English translation).

* cited by examiner

CLEANER

CROSS-REFERENCE TO RELATED APPLICATIONS

This application is a National Stage application under 35 U.S.C. § 371 of International Application No. PCT/KR2021/011492, filed on Aug. 27, 2021, which claims the benefit of Korean Application No. 10-2020-0177676, filed on Dec. 17, 2020. The disclosures of the prior applications are incorporated by reference in their entirety.

TECHNICAL FIELD

The present disclosure relates to a cleaner and more particularly to a vacuum cleaner to and from which a filter can be attached and detached easily.

BACKGROUND ART

In general, a cleaner is a home appliance which sucks small garbage or dust in a way of sucking air by using electricity and fills the garbage or dust in a dust bin included in the cleaner product. The cleaner is usually called a vacuum cleaner.

Such a cleaner can be divided into a manual cleaner which performs cleaning by being moved directly by a user and an automatic cleaner which performs cleaning while travels by itself. The manual cleaner can be divided into a canister vacuum cleaner, an upright vacuum cleaner, a hand vacuum cleaner, and a stick vacuum cleaner, etc., in accordance with the shape thereof.

In the past, the canister vacuum cleaner has been used widely as a household cleaner. However, recently, the hand vacuum cleaner and the stick vacuum cleaner, which include a dust bin formed integrally with the body of the cleaner and provides improved convenience for use, tend to be used a lot.

In the case of the canister vacuum cleaner, the body and the suction port thereof are connected by a rubber hose or pipe. In some cases, the cleaner can be used in such a way that a brush is inserted into the suction port.

The hand vacuum cleaner has the maximized portability, and thus, has a light weight and a short length. Therefore, the cleaning area of the cleaner may be limited. Accordingly, the hand vacuum cleaner is used to clean a local place such as on a desk or sofa, the inside of a vehicle.

The stick vacuum cleaner allows a user to use itself with a standing posture, and thus, the cleaning can be made without bending his/her waist forward. Therefore, it is advantageous for cleaning while moving over a wide area. While the handy vacuum cleaner cleans a narrow space, the stick vacuum cleaner is able to clean a wider space than the narrow space and to clean a high place out of reach. Recently, the stick vacuum cleaner is provided in the form of a module, so that the type of the cleaner is actively changed according to various objects.

As a prior art for the hand or stick vacuum cleaner, there is a vacuum cleaner having a cyclone separator. The cyclone separator according to the prior art includes a cyclone cleaning stage and an elongated filter fluidly disposed downstream of the cyclone cleaning stage. The filter is received within a duct surrounded by the cyclone cleaning stage. The filter includes a filtering portion that defines a tubular filter chamber, and an inlet portion includes an inlet that allows air to be introduced in a radial direction. Therefore, the air is introduced in the radial direction from the inlet portion and is discharged in the axial direction.

However, according to the prior art, there is a problem that the cyclone separator cannot be smaller as the filter is received within the cyclone separator. The filter must have a surface area larger than a certain value in order to show a sufficient filtration capacity. Therefore, when the filter is received within the cyclone separator as shown in the prior art, the cyclone separator must be made large enough, making it more difficult for the product to become smaller. In addition, as the size of the filter increases, there is also a problem that a space for collecting dust is reduced.

DISCLOSURE

Technical Problem

The purpose of the present disclosure is to provide a cleaner having a sufficient dust collection space.

The purpose of the present disclosure is to provide a cleaner equipped with a filter that not only reduces pressure loss and but also obtains a filtration performance.

The purpose of the present disclosure is to provide a cleaner that allows a filter to be easily replaced.

The technical problem to be overcome in this document is not limited to the above-mentioned technical problems. Other technical problems not mentioned can be clearly understood from those described below by a person having ordinary skill in the art.

Technical Solution

One embodiment is a cleaner including: a cyclone part of which one side has an inlet formed therein and the other side has an outlet formed therein; a housing which is connected to the cyclone part; a motor unit which is disposed in the housing, of which one side has a suction inlet formed therein that sucks air from the cyclone part, and of which the other side has a discharge port formed therein that discharges the air to the outside; and a filter which is disposed in the housing, of which one side covers the outlet of the cyclone part, and of which the other side covers the suction inlet of the motor unit.

The filter may include a first surface extending from a front to a left rear thereof; and a second surface extending from a front to a right rear thereof.

The filter may include a plurality of the first surfaces or a plurality of the second surfaces. The filter may further include a third surface that connects a right end of one second surface and a left end of the other first surface.

In the filter, the first surface and the second surface may extend up and down.

In the filter, a rear surface of the first surface and a rear surface of the second surface may form a flow path in an up and down direction.

The surface of the filter may be disposed to cross a direction of an axis of the cyclone flow.

The filter may be elongated in a longitudinal direction. On the basis of an imaginary straight line crossing the longitudinal direction, one side of the filter may cover the outlet of the cyclone part and the other side of the filter may cover the suction inlet of the motor.

The filter may be inserted into the housing in a direction perpendicular to a direction in which air is discharged from the cyclone part.

The cleaner may further include a suction portion that communicates with the inlet of the cyclone part.

In the cyclone part, an axis of the cyclone flow may be arranged in parallel to a longitudinal axis of the suction portion.

In the cyclone part, the inlet may be disposed in a direction perpendicular to the longitudinal axis of the suction portion.

The cyclone part may be disposed below the suction portion.

The motor unit may be disposed on the longitudinal axis of the suction portion.

The housing may further include: a handle which is disposed behind the filter; and a power supply unit which is disposed on one side of the handle. The motor unit may be disposed opposite to the power supply unit with respect to the handle.

Other embodiments of the present invention are included in description in detail and accompanying drawings.

Advantageous Effect

The cleaner according to the embodiment of the present disclosure has the following one or more effects.

First, the filter is disposed in the housing instead of the dust bin. One side of the filter covers the outlet of the cyclone part, and the other side covers the suction inlet of the motor. Therefore, an enough space can be obtained in the dust bin, and a sufficient dust collection space is secured.

Second, since the filter is composed of the first surface to the third surface, pressure loss can be reduced and a filtration performance is obtained.

Third, the filter forms a front flow path and a rear flow path. Therefore, the pressure loss can be reduced when the air flows. Also, dust can be evenly filtered at all portions of the filter.

Fourth, the axis of the cyclone flow is disposed in parallel to the longitudinal axis of the suction tube, so that the dust bins of various sizes can be variably installed.

Fifth, the motor unit is disposed opposite to the power supply unit with respect to the handle. Therefore, the user is able to operate the cleaner easily.

Advantageous effects of the present disclosure are not limited to the above-described effects and other unmentioned effects can be clearly understood from the description of the claims by those skilled in the art to which the present disclosure belongs.

MODE FOR INVENTION

Figure 1:
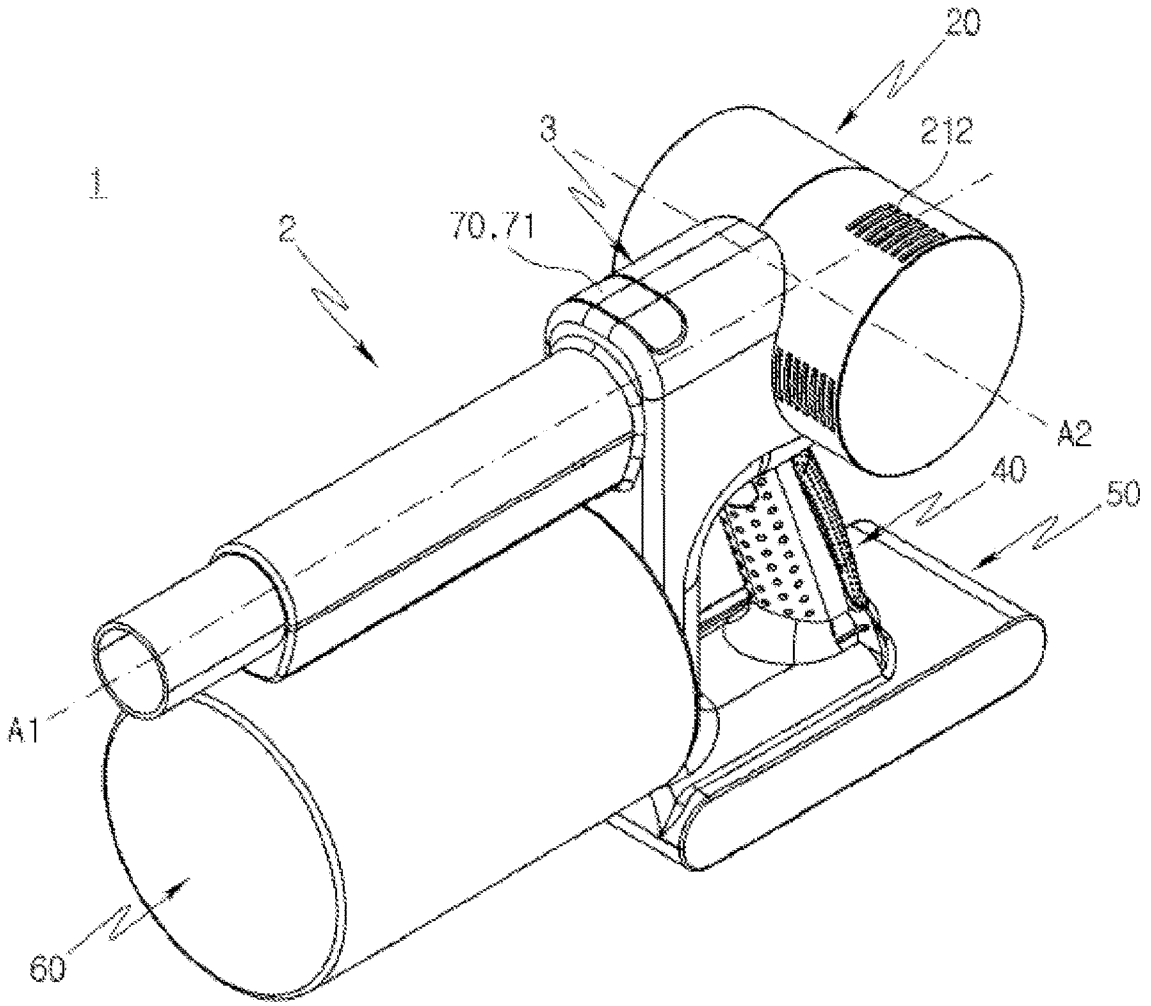
FIG. 1 is a perspective view of a cleaner according to an embodiment of the present disclosure.

Hereinafter, preferred embodiments of the present invention will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

In the description of the present invention, while terms such as the first and the second, etc., can be used to describe various components, the components may not be limited by the terms mentioned above. The terms are used only for distinguishing between one component and other components. For example, the first component may be designated as the second component without departing from the scope of rights of the invention. Similarly, the second component may be designated as the first component.

Similarly, the second component may be designated as the first component. The term of 'and/or' may include a combination or one of a plurality of related items mentioned.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Terms used in the present specification are provided for description of only specific embodiments of the present invention, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Also, the embodiment is provided for giving those skilled in the art more complete description. Therefore, the shapes and sizes and the like of components of the drawings may be exaggerated for clarity of the description.

Figure 2:
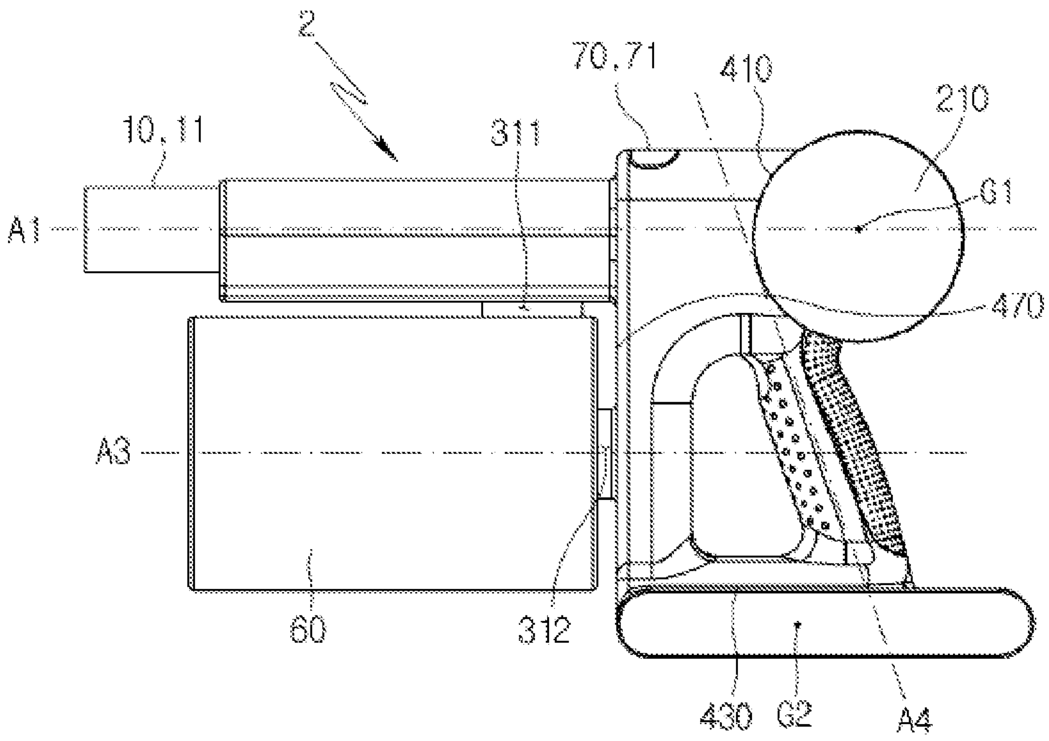
FIG. 2 is a right-side view of the cleaner according to the embodiment of the present disclosure.
Figure 3:
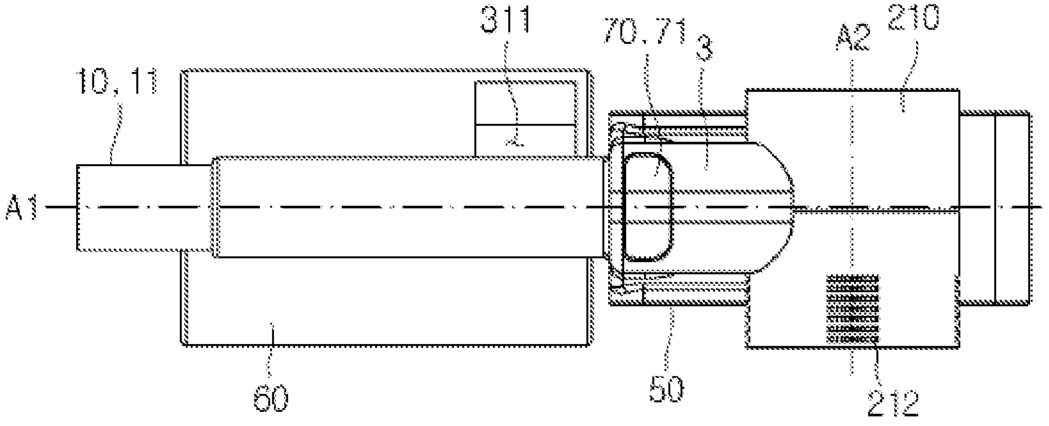
FIG. 3 is a plan view of the cleaner according to the embodiment of the present disclosure.

FIG. 1 is a perspective view of a cleaner 1 according to an embodiment of the present disclosure. FIG. 2 is a right-side view of the cleaner 1 according to the embodiment of the present disclosure. FIG. 3 is a plan view of the cleaner 1 according to the embodiment of the present disclosure.

Figure 4:
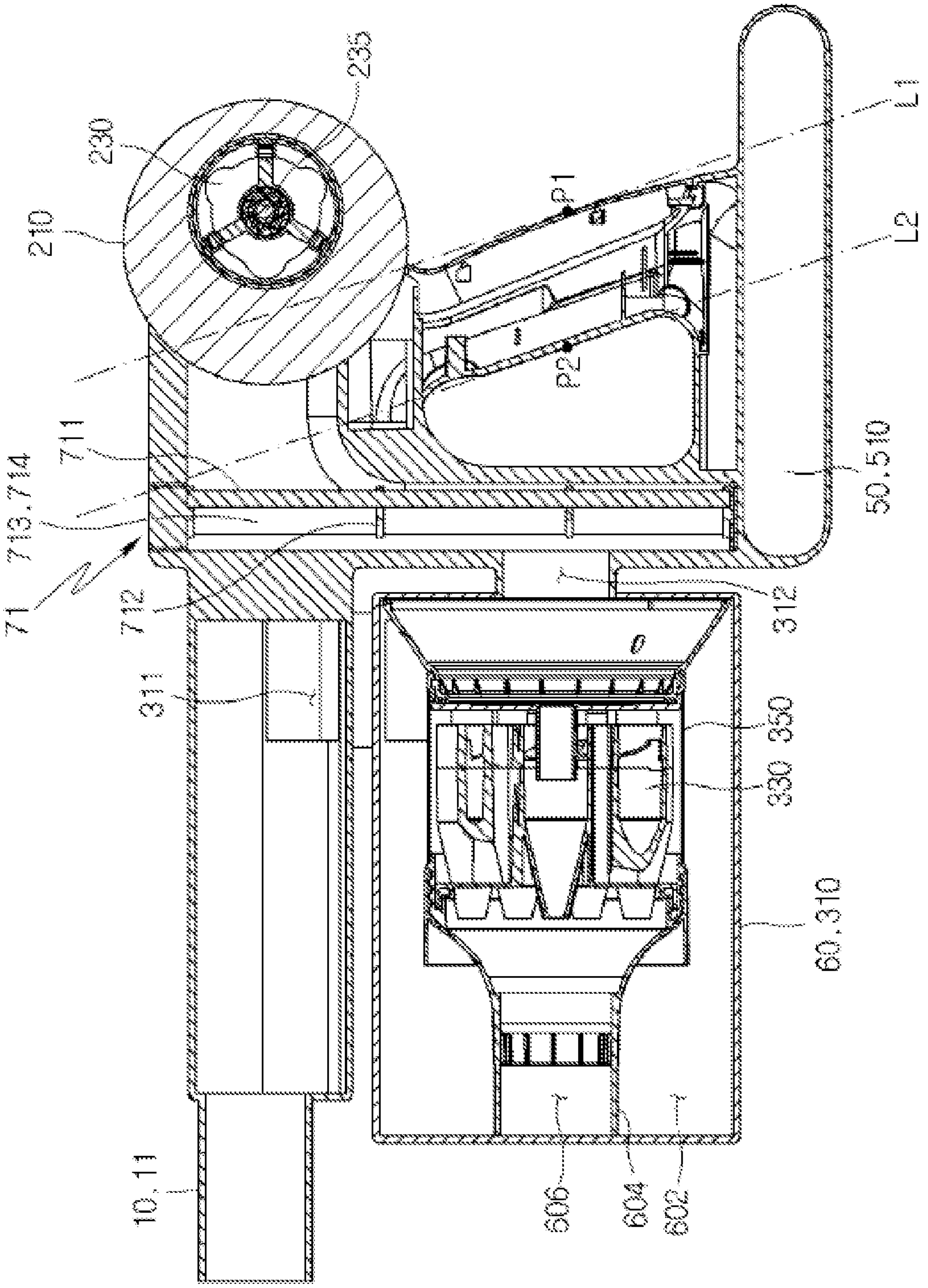
FIG. 4 is a cross-sectional view of the cleaner viewed from the direction of FIG. 2.

FIG. 4 is a cross-sectional view of the cleaner 1 according to the embodiment of the present disclosure.

Referring to FIGS. 1 to 4, the cleaner 1 according to the embodiment of the present disclosure may include a body 2. The body 2 may include a suction portion 10 which sucks dust-containing air.

A direction of one side on which the suction portion 10 is positioned with respect to a longitudinal axis A1 of the suction portion 10 is defined as a front direction, and a direction of the other side on which a motor unit 20 to be described later is positioned is defined as a rear direction. With respect to the body 2 shown in FIG. 1, a top is defined as an upward direction, and a bottom is defined as a downward direction.

An external appearance of the body 2 is formed by a housing 3.

A handle 40 is formed on the housing 3.

The suction portion 10 is coupled to a front of the housing 3.

A dust bin 60 is coupled to the front of the housing 3. An opening is formed in a coupling portion between the housing 3 and the dust bin 60, and the housing 3 and the dust bin communicate with each other.

A power supply unit 50 is coupled to the bottom of the housing 3.

The motor unit 20 is coupled to the top of the housing 3. The motor unit 20 may be coupled to a rear upper portion of the housing 3.

The suction portion 10 has a cylindrical shape with an open interior, has a structure that sucks dust-containing air, and may provide a suction path through which the dust-containing air can flow. The dust-containing air may be guided to the body 2 through the suction portion 10.

The suction portion 10 communicates with an inlet 311 of a cyclone part 30. The air sucked from a nozzle passes through the suction portion and flows into the cyclone part 30 through the inlet 311.

The body 2 may further include the motor unit 20, the cyclone part 30, the handle 40 and the power supply unit 50.

Here, the motor unit 20 is configured to create a flow of air (i.e., air flow) such that the dust-containing air can be introduced into the suction portion 10. The motor unit 20 may include a suction motor 230 which is received within a rear housing 210.

The rear housing 210 has a cylindrical shape with a predetermined diameter. Here, the center of the diameter of the rear housing 210 may be the same as the center of the diameter of the suction motor 230. In addition, a longitudinal axis A2 of the rear housing 210 may be coaxial with an axis of a motor shaft 235. This may be collectively referred to as the longitudinal axis A2 of the motor unit 20.

The suction motor 230 may include the motor shaft 235 and an impeller which is connected to the motor shaft 235 and rotates.

The suction motor 230 may be a Brushless DC (BLDC) motor. The BLDC motor is a DC motor without a brush. Since the BLDC motor has no brush that is an abrasive part, it has low electrical and mechanical noise, rotates at a high speed without problems, and low rotation noise.

Referring to FIG. 2, the motor unit 20 has a center of gravity G1. The center of gravity G1 of the motor unit 20 is a point on which the weight of the entire motor unit 20 including the suction motor 230 acts. The center of gravity G1 of the motor unit is disposed behind a center of gravity G2 of the power supply unit.

The motor unit 20 is disposed on a longitudinal axis A1 of the suction portion. A longitudinal axis A2 of the motor unit crosses the longitudinal axis A1 of the suction portion. The center of gravity G2 of the motor unit is disposed on the longitudinal axis A1 of the suction portion.

By having such an arrangement, moment generated in the cleaner 1 can be minimized. More specifically, the body 2 of the cleaner may be defined as one rigid body. Based on the body 2 of the cleaner, air is introduced biasedly toward the upper side. Here, if an air discharge port is formed at another position, moment is generated because an air inflow direction and an air discharge direction are different, and the cleaner may rotate in one direction. As a result, a user may feel uncomfortable when operating the cleaner 1. However, in the cleaner 1 according to the embodiment of the present disclosure, the motor unit 20 or the center of gravity G1 of the motor unit 20 is disposed on the longitudinal axis A1 of the suction portion, the moment generated in the cleaner 1 is minimized and the operation of the cleaner 1 becomes easier.

The cyclone part 30 communicates with the suction portion 10 and is configured by applying a principle in which a dust collector uses a centrifugal force, in order to separate the dust sucked into the body 2 through the suction portion 10.

For example, the cyclone part 30 may include a first cyclone 310 capable of separating dust by cyclone flow. The first cyclone 310 may communicate with the suction portion 10. The air and dust sucked through the suction portion 10 flow spirally along the inner circumferential surface of the first cyclone 310. An axis A3 of the cyclone flow of the first cyclone 310 may extend in the front-rear direction.

The cyclone part 30 may further include a second cyclone 330 that separates dust again from the air discharged from the first cyclone 310. Here, the second cyclone 330 may be positioned within the first cyclone 310 such that the size of the cyclone part 30 is minimized. The second cyclone 330 may include a plurality of cyclone bodies arranged in parallel. The air discharged from the first cyclone 310 may be divided into the plurality of cyclone bodies and may pass through the cyclone bodies.

Here, an axis A3 of the cyclone flow of the second cyclone 330 may also extend in the front-rear direction, and the axis A3 of the cyclone flow of the first cyclone 310 and the axis A3 of the cyclone flow of the second cyclone 330 may be coaxial with each other in the front-rear direction. They may be collectively referred to as an axis A3 of the cyclone flow of the cyclone part 30.

The axis A3 of the cyclone flow may be arranged in parallel to the longitudinal axis A1 of the suction portion. Thus, the sucked air flows backward along the longitudinal axis A1 of the suction portion and flows into the cyclone part 30 in a direction perpendicular to the axis A3 of the cyclone flow.

The body 2 may further include a cyclone filter 350 disposed to surround the second cyclone 330. The cyclone filter 350 is, for example, formed in a cylindrical shape, and guides the air separated from the dust by the first cyclone 310 to the second cyclone 330. The cyclone filter 350 filters dust in the process in which the air passes through the cyclone filter.

To this end, the cyclone filter 350 may include a mesh portion having a plurality of holes. The material of the mesh portion is not limited and the mesh portion may be a metal material.

Meanwhile, as another example, it is also possible for the cyclone part 30 to have a single cyclone, and even in this case, the axis A3 of the cyclone flow may extend in the front-rear direction.

Referring to FIG. 2, the cyclone part 30 has the inlet 311 formed in a radial direction of the dust bin 60. The inlet 311 of the cyclone part 30 is disposed perpendicular to the longitudinal axis A1 of the suction portion. The sucked air flows backward along the longitudinal axis A1 of the suction portion, flows in the radial direction of the dust bin 60, that is, downward, and is introduced into the dust bin 60. The air introduced into the dust container 60 flows through the cyclone part 30 and has a complex flow path. In this process, dust is separated.

An outlet 312 is formed in the cyclone part 30 in the longitudinal direction of the dust bin 60. That is to say, the outlet 312 is formed in a direction of the axis A3 of the cyclone flow. The air separated from the dust while flowing through the cyclone part 30 is discharged from the dust bin 60 in the longitudinal direction along the axis A3 of the cyclone flow, and is introduced into the housing 3. The air introduced into the housing 3 passes through filters 70 and 71.

The cyclone part 30 is disposed below the suction portion 10. Alternatively, the dust bin in which the cyclone part 30 is received is disposed below the suction portion 10. Accordingly, the air that has flowed backward along the suction portion 10 changes its flow direction into a downward direction and is introduced into the cyclone part 30.

Through this arrangement, there is an effect that heavy dust is not settled at the rear of the suction portion 10 and all the dust is introduced into the cyclone part 30.

The handle 40 allows the user to grip and move the cleaner 1, and is disposed in an opposite direction to the suction portion 10 with respect to the cyclone part 30. The handle 40 may include a grip portion 450 that the user grips with his/her hand. Here, the grip portion 450 has a substantially cylindrical shape and has a longitudinal axis A4. In addition, the grip portion 450 may be disposed in a shape in which an upper portion thereof is inclined toward the front.

The power supply unit 50 is a component for supplying power to the motor unit 20 and includes a battery 510. An upper side of the power supply unit 50 may be disposed adjacent to the handle 40, and a front of the power supply unit 50 may be disposed adjacent to a portion of a lower portion of the outer circumferential surface of the dust bin 60 to be described later.

Referring to FIG. 2, the power supply unit 50 has the center of gravity G2. The center of gravity G2 of the power supply unit 50 is a point on which the weight of the entire power supply unit 50 including the battery 510 acts. The center of gravity G2 of the power supply unit is disposed in front of the center of gravity G1 of the motor unit.

The body 2 may further include the dust bin 60 for storing the dust separated by the cyclone part 30.

The dust bin 60 may include a cylindrical dust collection body 610. For example, it is also possible that the dust collection body 610 serves as the first cyclone 310 without the separate first cyclone 310. The entire or at least a portion of the second cyclone 330 may be positioned within the dust bin 60.

A dust storage guide 604 for guiding the storage of the dust separated by the second cyclone 330 may be disposed within the dust collection body 610. The dust storage guide 604 may be coupled to the front of the second cyclone 330.

The dust storage guide 604 partitions an interior space of the dust collection body 610 into a first dust storage 602 in which the dust separated by the first cyclone 310 is stored and a second dust storage 606 in which the dust separated by the second cyclone 330 is stored. In other words, the interior space of the dust storage guide 604 is the second dust storage 606, and the space between the dust storage guide 604 and the dust collection body 610 is the first dust storage 602.

Hereinafter, the arrangement relationship of the components will be described with reference to FIGS. 1 to 3.

Referring to FIG. 1, the longitudinal axis A2 of the motor unit 20 is disposed perpendicular to the longitudinal axis A1 of the suction portion 10, and is disposed in parallel to a bottom surface B of the power supply unit 50. Here, the longitudinal axis A1 of the suction portion 10 is also disposed in parallel to the bottom surface B of the power supply unit 50.

Through this arrangement, compared to a case where the longitudinal axis A2 of the motor unit 20 is disposed in parallel to the longitudinal axis A1 of the suction portion 10, one component of the body 2 can be prevented from excessively protruding to the rear of the grip portion 450. Therefore, when the user grips the handle 40 for cleaning, a portion of the handle interfered caused by contact with the user's wrist can be reduced.

Also, through this arrangement, when the cleaner 1 is viewed from the side, the outer circumferential surface of the rear housing 210 has a circular shape. As a result, when the user grips the handle 40 for cleaning, a curved surface may be naturally formed in a direction in which the wrist extends from the palm. Therefore, compared to the case where the longitudinal axis A2 of the motor unit 20 is disposed in parallel to the longitudinal axis A1 of the suction portion 10, the user's grip feeling on the cleaner 1 is further improved.

Referring to FIG. 2, the axis A3 of the cyclone flow may be arranged in parallel to the longitudinal axis A1 of the suction portion. Thus, the sucked air flows backward along the longitudinal axis A1 of the suction portion and flows into the cyclone part 30 in a direction perpendicular to the axis A3 of the cyclone flow.

Through this arrangement, the sizes of the dust bin 60 and the cyclone part 30 can be increased. In order to effectively generate the cyclone flow, the cyclone part 30 and the dust bin 60 usually have lengths in the axial direction longer than lengths in the radial direction. Therefore, the axis of the cyclone flow is intended to be parallel to the longitudinal axis A1 of the suction portion in the front-rear direction, so that there is an effect of increasing the inner space of the dust bin by increasing the length of the dust bin 60.

Referring to FIG. 2, the motor unit 20 is disposed opposite to the power supply unit 50 with respect to the handle 40. More specifically, the motor unit 20 is disposed opposite to the power supply unit 50 with respect to the longitudinal axis A4 of the grip portion. The motor unit may be disposed on the handle 40, and the power supply unit 50 may be disposed below the handle 40. Alternatively, the motor unit 20 may be disposed behind the handle 40 and the power supply unit 50 may be disposed in front of the handle 40.

The center of gravity G1 of the motor unit and the center of gravity G2 of the power supply unit are disposed symmetrically with respect to the handle 40. For example, with respect to the longitudinal axis A4 of the grip portion, the center of gravity G1 of the motor unit and the center of gravity G2 of the power supply unit are disposed on opposite sides.

An upper portion of the handle 40 is disposed in front of the center of gravity G1 of the motor unit, and a lower portion of the handle 40 is disposed behind the center of gravity G2 of the power supply unit.

Through this arrangement, the user is able to operate the cleaner 1 more easily. When the center of gravity G1 of the motor unit and the center of gravity G2 of the power supply unit are not symmetrical with respect to the handle 40, the weight of the cleaner substantially felt by the user may be greater. For example, when both the motor unit 20 and the power supply unit 50 are disposed in front of the handle 40, a forward portion of the cleaner 1 is tilted downward, so that it may be difficult to operate the cleaner. Conversely, when both the motor unit 20 and the power supply unit 50 are disposed behind the handle 40, the forward portion of the cleaner 1 is lifted up, so that it may be difficult to operate the cleaner. Therefore, the motor unit 20 and the power supply unit 50 are disposed on both sides of the handle 40, thereby easily operating the cleaner 1 without tilting to one side.

Referring to FIG. 4, handle extension lines L1 and L2 formed by extending tangent lines contacting the outer circumferential surface of the handle 40 may be spaced apart from each other by a predetermined distance in the radial direction of the suction motor 230.

More specifically, as the body 2 is cut by a plane including the longitudinal axis A1 of the suction portion 10 and viewed, the handle extension lines L1 and L2 protrude most to the outside of the handle 40 may refer to imaginary extension lines L1 and L2 formed by extending a tangent line contacting the handle at outermost points P1 and P2 protruding the most to the outside of the handle 40.

Since the handle extension lines L1 and L2 are arranged to be spaced apart from the suction motor 230 by a predetermined distance in the radial direction, the handle extension lines L1 and L2 do not pass through the suction motor 230. In other words, the handle extension lines L1 and L2 and the suction motor 230 do not come into contact with each other even at any one point. That is to say, the handle extension lines L1 and L2 are disposed not to meet any one portion of the suction motor 230.

Through this, the center of gravity G1 of the suction motor 230 may be disposed to be located behind the handle extension lines L1 and L2. Also, the center of gravity G1 of the suction motor 230 may be disposed in an opposite direction to the suction portion 10 on the basis of the longitudinal axis A4 of the handle 40.

Through such an arrangement, the center of gravity G1 of the suction motor 230 may be formed close to the user's wrist. Accordingly, a moment force due to the center of gravity G1 can be reduced, thereby reducing the load applied to the user's wrist and reducing fatigue in performing a cleaning operation for a long time.

Figure 6:
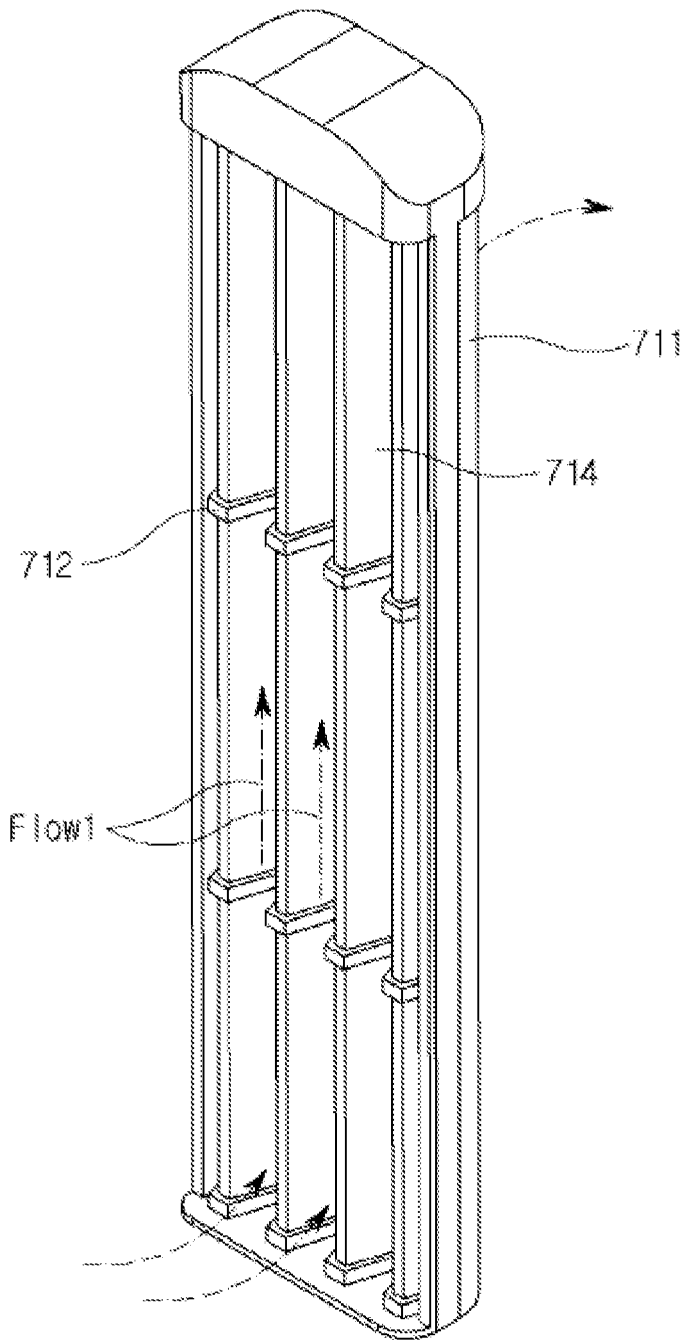
FIG. 6 is a front perspective view of the filter according to the embodiment of the present disclosure.
Figure 7:
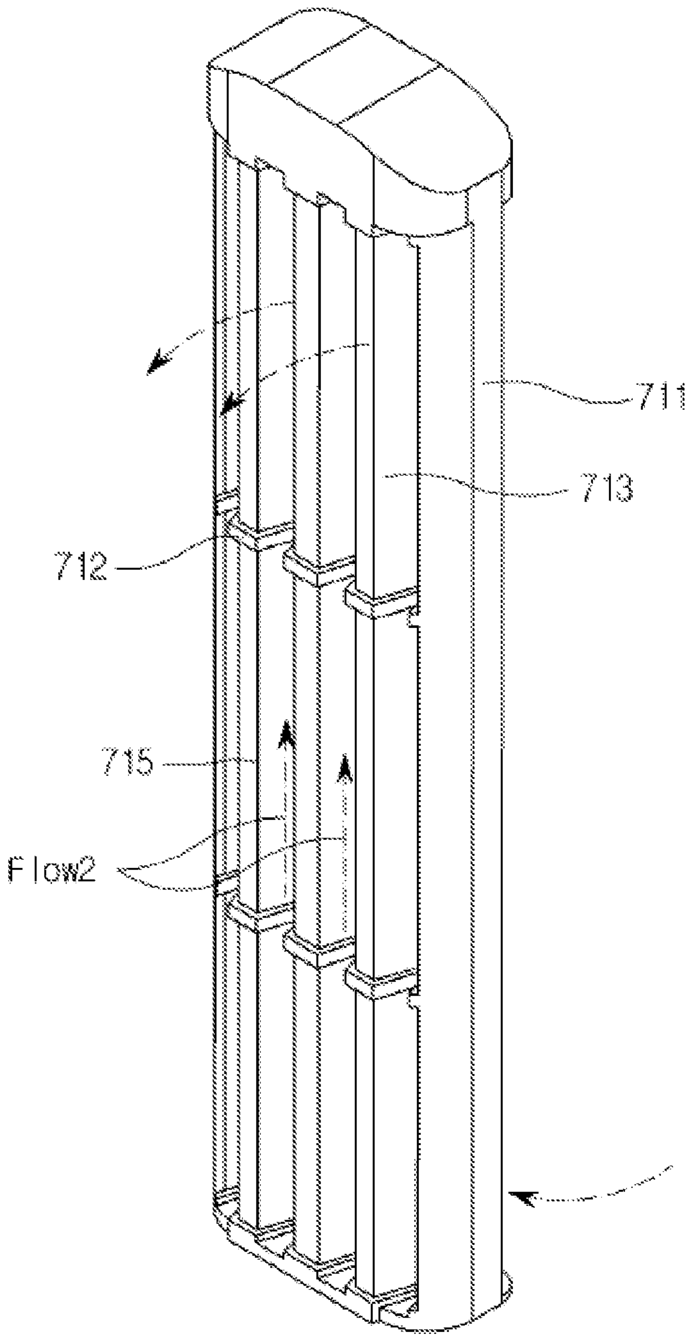
FIG. 7 is a rear perspective view of the filter according to the embodiment of the present disclosure.

Hereinafter, the filters 70 and 71 will be described with reference to FIGS. 6 to 8.

The filters 70 and 71 are disposed on an air flow path and filter dust contained in the air. The filters 70 and 71 installed in the cleaner 1 according to the embodiment of the present disclosure include a pre-filter 71 and a HEPA filter (not shown).

Meanwhile, the attachable and detachable filters 70 and 71 according to the embodiment of the present disclosure include only the pre-filter 71 in a narrow sense. However, without being limited to the following description, the filters 70 and 71 may include even a HEPA filter within a range in which a person skilled in the art within the technical scope of the present invention can easily adopt.

The pre-filter 71 is configured to filter out dust that has not been collected by the cyclone part 30.

The pre-filter 71 may be a mesh filter having a cylindrical shape. For example, the pre-filter 71 may include materials such as nylon and spun-bonded fabric. The spun-bonded fabric is a type of a nonwoven fabric made by spinning synthetic fibers such as polypropylene (PP) and then applying heat to the synthetic fiber to bond them.

The body 2 may further include a high efficiency particulate air (HEPA) filter (not shown) disposed between the pre-filter 71 and the motor unit 20.

The HEPA filter (not shown) serves to finally filter out fine dust that has not been filtered out by the pre-filter 71. The HEPA filter may be received within the housing 3.

The air which has passed through the pre-filter 71 after being discharged from the cyclone part 30 passes through the HEPA filter (not shown) and is discharged to the outside through the suction motor 230.

In the present invention, it has been described that the cleaner 1 includes the pre-filter 71 and the HEPA filter (not shown). Also, it should be noted that the type and the number of filters 71 are not limited.

The filter 71 is disposed in the housing 3. One side of the filter 71 covers the outlet 312 of the cyclone part, and the other side covers a suction inlet of the motor.

A filter insertion hole 716 into which the filter 71 is inserted is formed in the top of the housing 3, and the filter 71 may be installed in such a way as to be inserted downward through the filter insertion hole 716.

The filter 71 includes a first surface 713 extending from the front to the left rear of the filter 71, and a second surface 714 extending from the front to the right rear of the filter 71. FIG. 6 is a front perspective view of the filter 71 and shows the second surface 714 extending from the front to the right rear of the filter 71. FIG. 7 is a rear perspective view of the filter 71, and shows the first surface 713 extending from the front to the left rear of the filter 71. The first surface 713 and the second surface 714 may be disposed in a triangular shape in which the fronts of the first surface 713 and the second surface 714 are coupled to each other and a distance between them gradually increases toward the rear.

The first surface 713 elongates in an up and down direction. As with the first surface 713, the second surface 714 elongates in the up and down direction.

The outlet 312 of the cyclone part is disposed on either an upper or lower portion of the filter 71, and the suction inlet of the motor is disposed on the upper or lower portion of the filter 71 where the outlet 312 of the cyclone part is not disposed. Taking FIG. 4 as an example, the outlet 312 of the cyclone part is disposed in front of a lower half surface of the filter 71, and the suction inlet of the motor is disposed on the upper half surface of the filter 71. Therefore, the flow of air passing through the filter 71 is not formed in one direction, and the air flows in an S-curve. Therefore, the air is able to pass through all the surfaces of the filter 71. Also, as the cross-sectional area of the filter 71 used increases, a filtration performance of the filter 71 is maximized.

In the filter 71, the rear surface of the first surface 713 and the rear surface of the second surface 714 form a flow path in the up and down direction. Referring to FIG. 8, the rear surface of the first surface 713 and the rear surface of the second surface 714 form a triangular rear flow path. In addition, the front surface of one first surface 713 and the front surface of the other second surface 714 form a triangular front flow path.

Air introduced from the outlet 312 of the cyclone part may pass through any one of the first surface 713 to a third surface 715 from the lower portion of the filter 71. The air that has passed through the lower portion of the filter 71 may move to the upper portion of the filter 71 along the rear flow path, and pressure loss can be minimized.

Conversely, the rest of the air introduced from the outlet 312 of the cyclone part may move to the upper portion of the filter 71 along the front flow path, and may pass through any one of the first surface 713 to the third surface 715 from the upper portion of the filter 71. Since the air moves to the upper portion of the filter 71 along the front flow path before passing through the upper portion of the filter 71, pressure loss can be minimized.

The filter 71 includes a plurality of the first surfaces 713 or a plurality of the second surfaces 714, and further includes the third surface 715 that connects the right end of one second surface 714 and the left end of the other first surface 713. Taking FIG. 8 as an example, the right end of the third surface 715 is coupled to the right end of one second surface 714, and the left end of the third surface 715 is coupled to the left end of the other first surface 713 adjacent to the second surface 714.

The third surface 715 is disposed perpendicular to the air flow path. More specifically, a width of the third surface 715 is formed in the left and right direction. Therefore, unlike the first surface 713 or the second surface 714, the air passes in a perpendicular direction.

As with the first surface 713 or the second surface 714, the third surface 715 extends up and down.

The filter 71 includes a filter case 711 forming the exterior thereof and a filter frame 712 supporting the first surface 713 to the third surface 715.

The filter case 711 forms the exterior of the filter 71. The filter case 711 may be composed of a handle, a frame forming the shape of both sides of the filter 71 and extending downward from both side ends of the handle, and a frame forming the shape of a lower end of the filter 71. When viewed from the front, the filter case 711 may have a hollow rectangular shape.

After gripping the handle of the filter case 711, the user may insert the filter downward through the filter insertion hole 716.

Figure 8:
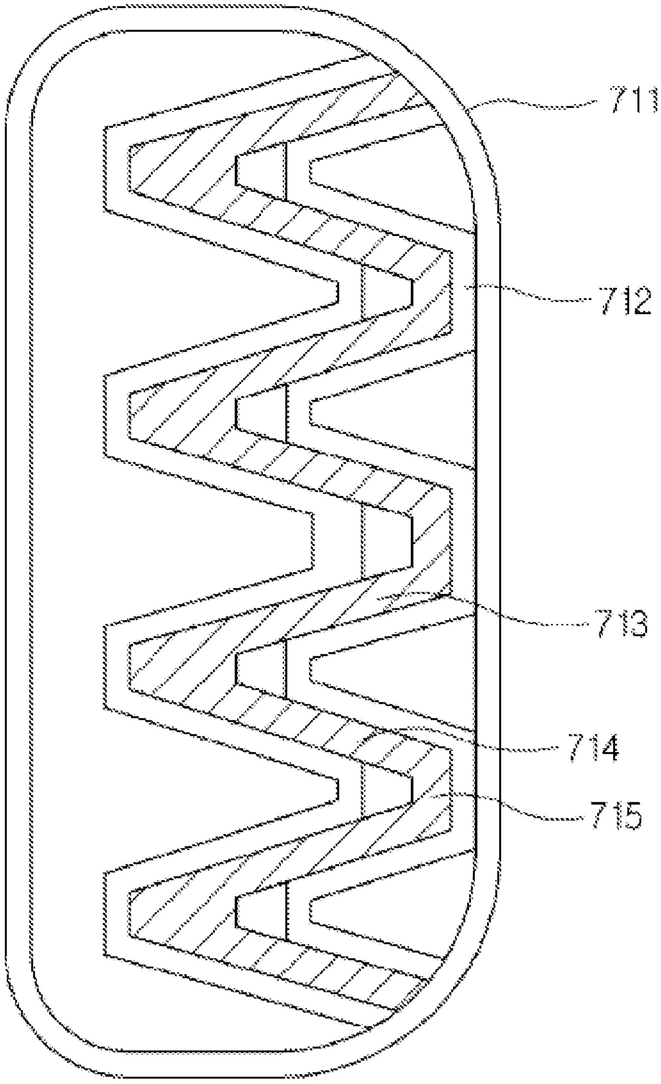
FIG. 8 is a plan cross-sectional view of the filter according to the embodiment of the present disclosure.

Referring to FIG. 8, the filter frame 712 is supported by the filter case 711 and supports the first surface 713 to the third surface 715. The filter frame 712 is coupled to the frame constituting both sides of the filter case 711. The filter frame 712 supports the first surface 713 to the third surface 715 by contacting at least a portion of the first surface 713 to the third surface 715.

The cross section of the first surface 713 to the third surface 715 viewed from the top may have a Z-shape or a zigzag shape, and the filter frame 712 may have a Z-shape or a zigzag shape to suit the shape of the cross section of the first surface 713 to the third surface 715.

The filter frame 712 may be disposed on the front surface or the rear surface of the first surface 713 to the third surface 715. Alternatively, as shown in FIG. 8, the filter frame 712 may be disposed on both the front and rear surfaces of the first surface 713 to the third surface 715.

Referring to FIG. 4, the surface of the filter 71 is disposed to cross the direction of the axis A3 of the cyclone flow. Referring to FIG. 4, the direction of the axis A3 of the cyclone flow is the front-rear direction, and the surface of the filter 71 is disposed to cross the direction of the axis A3 of the cyclone flow, so that the air discharge from the cyclone part 30 is filtered.

Figure 5:
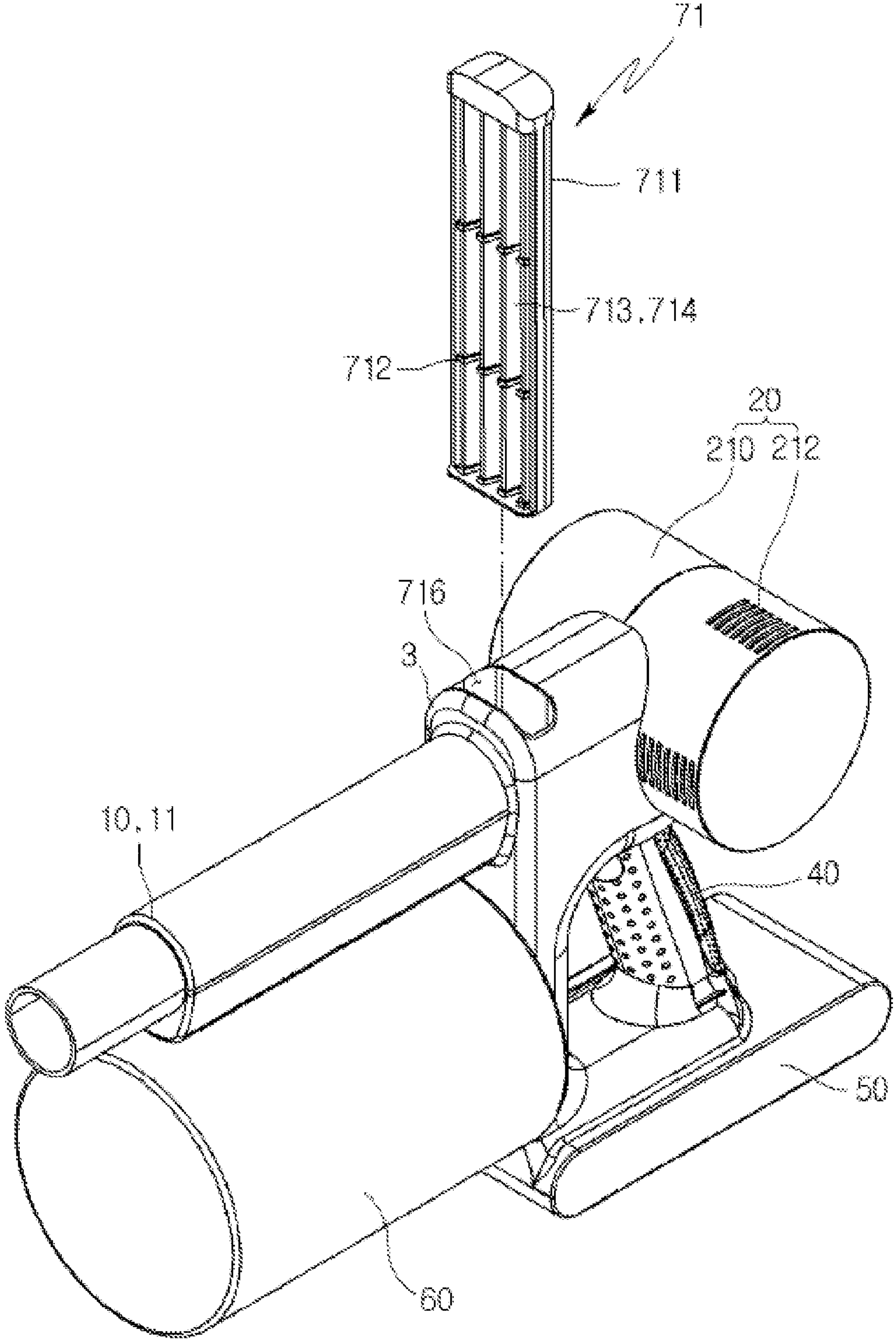
FIG. 5 is an exploded perspective view of the cleaner when a filter in FIG. 1 is separated.

The filter 71 is elongated in the longitudinal direction. Referring to FIGS. 4 and 5, the longitudinal direction of the filter 71 is an up and down direction. Based on an imaginary straight line A5 crossing the longitudinal direction of the filter 71, One side of the filter 71 covers the outlet 312 of the cyclone part, and the other side covers the suction inlet of the motor. Referring to FIG. 4, the imaginary straight line A5 crossing the longitudinal direction of the filter 71 may be defined as a straight line extending from the up and down center of the filter 71 in the width direction. In other words, the imaginary straight line A5 crossing the longitudinal direction of the filter 71 may be a horizontal line at the longitudinal center of the filter 71. Through such an arrangement, the flow path of air flowing into the filter 71 and the flow path of air discharged from the filter 71 are spaced apart, and a front flow path is formed in the front of the filter 71 and a rear flow path is formed in the rear of the filter 71. Therefore, the pressure loss can be minimized, and all the surfaces of the filter 71 can evenly filter dust.

The filter 71 is inserted into the housing 3 in a direction perpendicular to the direction in which air is discharged from the cyclone part 30. Referring to FIG. 4, the direction in which air is discharged from the cyclone part 30 is a horizontal direction, that is, backward, which is a horizontal direction, and the filter 71 is inserted into the housing 3 in a perpendicular direction, that is, downward.

Hereinafter, the operation and effect of the cleaner 1 according to the embodiment of the present disclosure described above will be described.

The air sucked from the nozzle of the cleaner 1 flows into the suction portion 10. The air has flowed into the suction portion 10 passes through the dust bin 60, passes through the filter 71, passes through the motor, and then is discharged to the outside.

The longitudinal axis A1 of the suction portion is disposed in the front-rear direction. The axis A2 of the cyclone flow is arranged in parallel to the longitudinal axis A1 of the suction portion. The inlet 311 of the cyclone part is perpendicular to the longitudinal axis A1 of the suction portion. Thus, air flows into the cyclone part 30 in the perpendicular direction.

The air that has flowed into the dust bin 60 has a cyclone flow by the first cyclone. The dust is primarily separated while the air has a cyclonic flow. The air primarily separated from dust flows inwardly through the cyclone filter 350.

The air that has flowed into the cyclone filter 350 has a cyclone flow by the second cyclone. The dust is secondarily separated while the air has a cyclonic flow. The air secondarily separated from dust is discharged to the housing 3 through the outlet 312 of the cyclone part. The outlet 312 of the cyclone part is formed in the direction of the axis A2 of the cyclone flow.

The air introduced into the housing 3 is filtered while passing through the filter 71 and. The surface of the filter 71 is disposed to cross the axial direction of the cyclone flow, and the air is filtered while passing through the surface of the filter 71.

The outlet 312 of the cyclone part is disposed on either an upper or lower portion of the filter 71, and the suction inlet of the motor is disposed on the upper or lower portion of the filter 71 where the outlet 312 of the cyclone part is not disposed. Taking FIG. 4 as an example, the outlet 312 of the cyclone part is disposed on the lower portion of the filter 71, and the suction inlet of the motor is disposed on the upper portion of the filter 71. Accordingly, a portion of the introduced air passes through the lower portion of the filter 71, passes through the rear flow path of the filter, and flows into the motor. The rest of the introduced air passes through the front flow path of the filter, passes through the upper portion of the filter 71, and then flows into the motor.

The filter 71 includes the first surface 713 to the third surface 715. The first surface 713 extends from the front to the left rear, and the second surface 714 extends from the front to the right rear. The third surface 715 connects the right end of one second surface 714 and the left end of the other first surface 713. The air is filtered while passing through at least one of the first surface 713 to the third surface 715.

The rear surface of the first surface 713 and the rear surface of the second surface 714 form a rear flow path. The air filtered from the lower portion of the filter 71 rises through the rear flow path.

The front surface of one first surface 713 and the front surface of the other second surface 714 form a front flow path. The air to be filtered in the upper portion of the filter 71 passes through the front flow path and then is filtered while passing through the filter 71.

Figure 9:
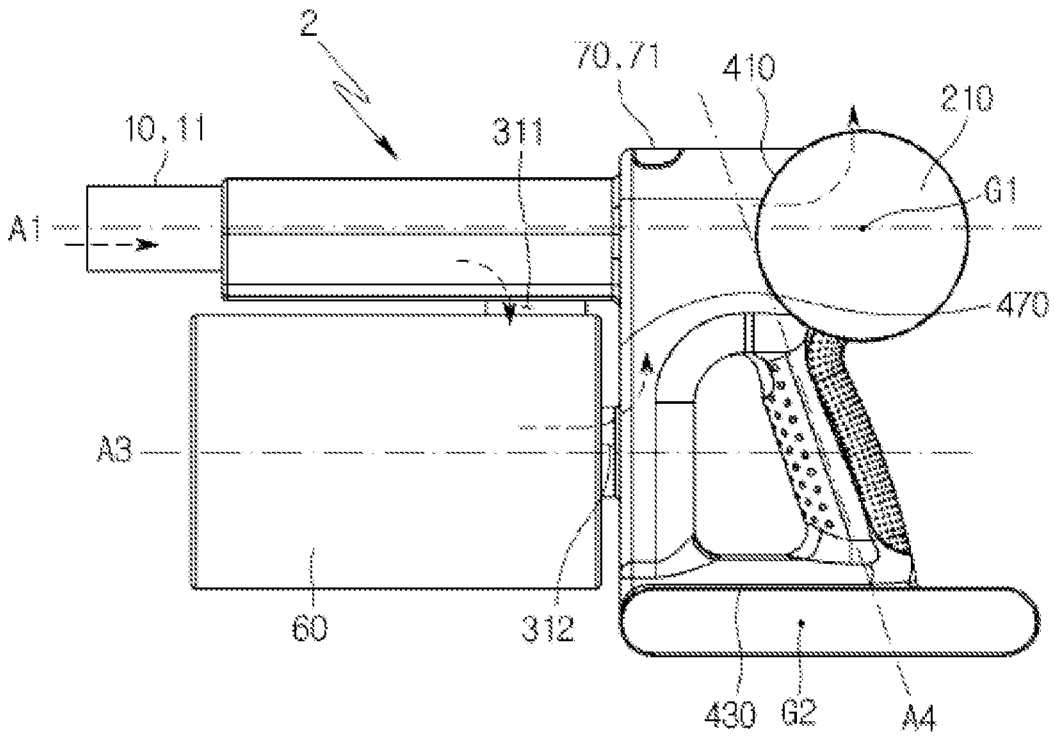
FIG. 9 is a view showing schematically a flow of air flowing through the cleaner according to the embodiment of the present disclosure.
Figure 10:
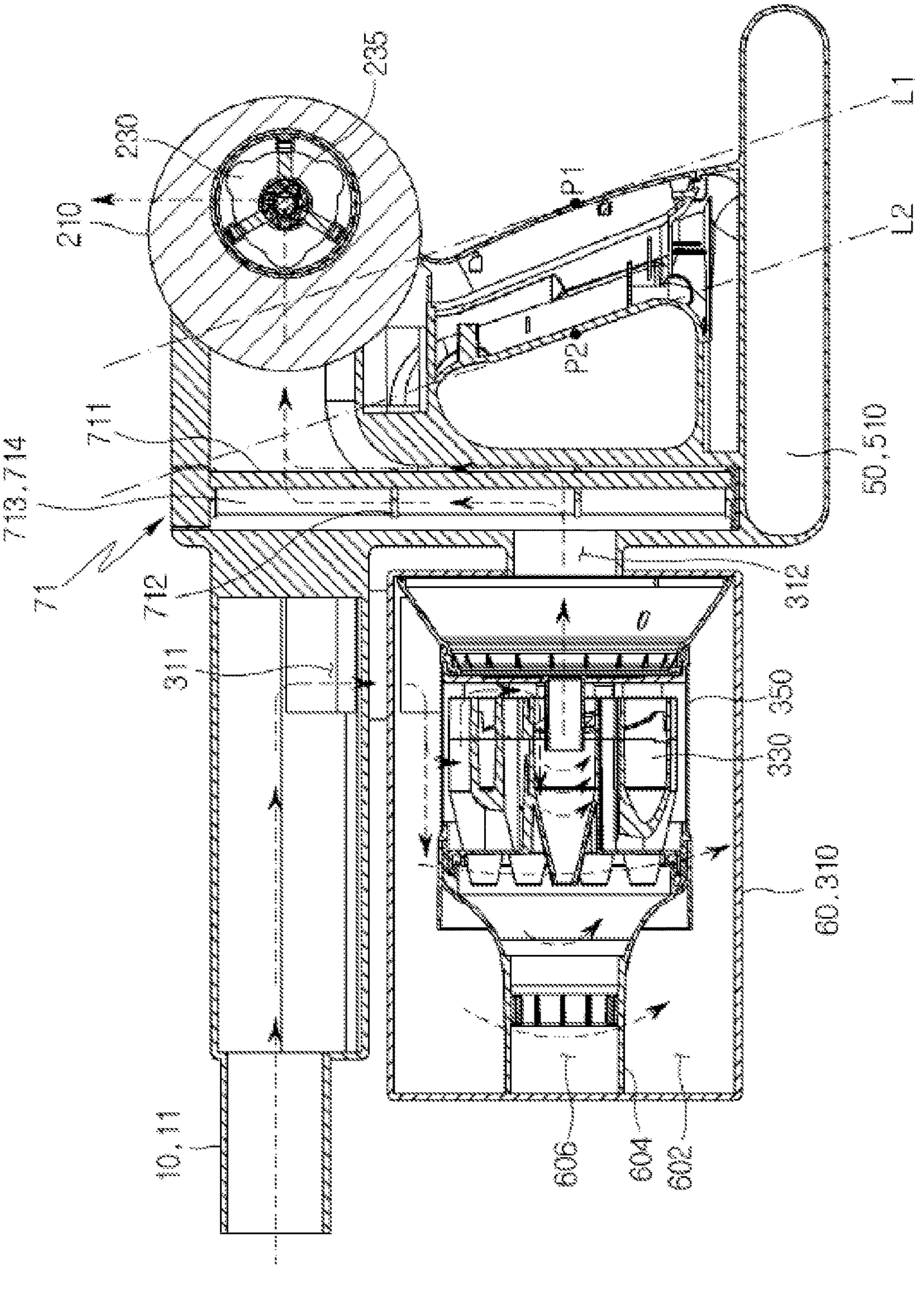
FIG. 10 is a view showing in more detail air flow within a dust bin and air flow in the filter in FIG. 9.

Referring to FIGS. 9 and 10, air flow within the cleaner will be described.

According to the embodiment of the present disclosure, the inflow direction of air introduced into the suction motor 230 is parallel to the longitudinal axis A1 of the suction portion. The discharge direction of air discharged from the cyclone part 30 is parallel to the longitudinal axis A1 of the suction portion. The flow of the air flowing within the cleaner includes at least one bending point at which the flow direction of the air is changed from the front-rear direction to the up and down direction.

Referring to FIG. 9, air is introduced from the front end of the suction portion 10 in parallel to the longitudinal axis A1 of the suction portion.

The air which has been introduced into the suction portion 10 is discharged in a direction perpendicular to the longitudinal axis A1 of the suction portion and is introduced into the cyclone part 30. Referring to FIG. 9, the flow direction of the air introduced horizontally in parallel to the longitudinal axis A1 of the suction portion is bent downward and the air is introduced into the cyclone part 30. The bending point may be formed at the inlet 311 of the cyclone part.

Referring to FIG. 10, the air introduced into the cyclone part 30 causes a cyclone flow therewithin. In the first cyclone 310, the air has a cyclonic flow around the axis of the cyclone flow, and a portion of the air flows into the second cyclone 330 disposed within the first cyclone 310. In the second cyclone 330, the air has a cyclonic flow around the axis of the cyclone flow, and a portion of the air is discharged in the axial direction of the cyclone flow through the outlet 312 of the cyclone part. Referring to FIG. 9, an imaginary bending point may be formed between the inlet 311 and the outlet 312 of the cyclone part.

Referring to FIG. 9, the flow direction of the air introduced into the filter 71 in the axial direction of the cyclone flow is changed into an upward direction. The upward air flow is parallel to the longitudinal direction of the filter 71. A bending point may be formed at an inlet end of the filter 71.

Referring to FIG. 10, the flow direction of the air that has moved upward in the longitudinal direction of the filter 71 is changed toward the suction motor 230. Here, the inflow direction of the air introduced into the suction motor 230 is parallel to the longitudinal axis A1 of the suction portion. A bending point may be formed between the filter 71 and the suction motor 230.

In the filter 71, the first surface 713 to the third surface 715 are formed in a Z-shape or a zigzag shape, and the surface area thereof is increased to improve filtering performance.

The first surface 713 and the second surface 714 of the filter 71 form the rear flow path at the rear, so that a portion of the air filtered in the lower portion of the filter 71 is easily guided to the upper portion. In addition, the first surface 713 and the second surface 714 of the filter 71 form a front flow path at the front, so that the rest of air to be filtered in the upper portion of the filter 71 is easily guided to the upper portion. Therefore, there is an effect of minimizing the pressure loss.

Also, the motor unit 20 is disposed such that the center of gravity G1 of the motor unit is formed behind the longitudinal axis A5 of the handle, and the power supply unit 50 is formed such that the center of gravity G2 of the power supply unit is formed in front of the longitudinal axis A5 of the handle. Therefore, a moment force due to the center of gravity G1 of the motor unit and the center of gravity G2 of the power supply unit can be prevented from being concentrated on one side. As a result, when the user performs cleaning, the load applied to the user's wrist can be reduced.

Also, the motor unit 20 is disposed behind the longitudinal axis A5 of the handle, so that the height of the dust bin 60 can be increased, and as a result, a dust holding capacity can be increased.

Also, when the motor unit 20 is disposed behind the handle 40, the longitudinal axis A2 of the motor unit is perpendicular to the longitudinal axis A1 of the suction portion and is parallel to the bottom surface of the power supply unit 50. Therefore, a length by which the motor unit 20 protrudes to the rear of the handle 40 can be minimized. Accordingly, when the user grips the handle 40 for cleaning, a portion of the handle interfered caused by contact with the user's wrist can be reduced.

Also, the axis A3 of the cyclone flow is disposed in parallel to the longitudinal axis A1 of the suction portion, and thus, the length of the cyclone part 30 or the dust bin 60 is increased, so that the cyclone part 30 or the dust bin 60 can be designed to be large.

Although the foregoing has described a specific embodiment of the present disclosure, it can be understood by those skilled in the art that the present disclosure is not limited to the illustrated embodiment and can be variously changed and modified to other specific embodiments without departing from the spirit and scope of the present disclosure. Therefore, the scope of the present disclosure should be determined not by the described embodiments but by the spirit as defined by the appended claims.

The invention claimed is:

1. A cleaner comprising:

a cyclone part having an inlet and an outlet formed therein;

a housing connected to the cyclone part;

a motor unit disposed in the housing, the motor unit having (i) a first side defining a suction inlet configured to suction air from the cyclone part, and (ii) a second side defining a discharge port configured to discharge the air to an outside of the motor unit; and a filter disposed in the housing, the filter having (i) a first side that covers the outlet of the cyclone part, and (ii) a second side that covers the suction inlet of the motor unit, wherein the suction inlet of the motor unit is disposed at one of an upper side and a lower side of the filter, and the outlet of the cyclone part is disposed at the other of the upper and lower sides of the filter.

2. The cleaner of claim 1, wherein the filter comprises:

a first surface extending from a front to a left rear thereof; and a second surface extending from the front to a right rear thereof.

3. The cleaner of claim 2, wherein, in the filter, the first surface and the second surface extend up and down.

4. The cleaner of claim 3,
wherein the outlet of the cyclone part is disposed on either an upper or lower portion of the filter,
and wherein the suction inlet of the motor unit is disposed on the upper or lower portion of the filter where the outlet of the cyclone part is not disposed.

5. The cleaner of claim 2, wherein, in the filter, a rear surface of the first surface and a rear surface of the second surface form a flow path in an up and down direction.

6. The cleaner of claim 1,
wherein the filter comprises a plurality of first surfaces extending from a front to a left rear thereof or a plurality of second surfaces extending from the front to a right rear thereof, and
wherein the filter further comprises a third surface that connects a right end of a second surface of the plurality of second surfaces and a left end of a first surface of the plurality of first surfaces.

7. The cleaner of claim 1, wherein a surface of the filter is disposed to cross a direction of an axis of a cyclonic flow in the cyclone part.

8. The cleaner of claim 1,
wherein the filter is elongated in a longitudinal direction, and
wherein, based on an imaginary straight line crossing the longitudinal direction, one side of the filter covers the outlet of the cyclone part and the other side of the filter covers the suction inlet of the motor unit.

9. The cleaner of claim 1, wherein the filter is inserted into the housing in a direction perpendicular to a direction in which air is discharged from the cyclone part.

10. The cleaner of claim 1, further comprising a suction portion that communicates with the inlet of the cyclone part.

11. The cleaner of claim 10, wherein, in the cyclone part, an axis of a cyclonic flow in the cyclone part is arranged in parallel to a longitudinal axis of the suction portion.

12. The cleaner of claim 10, wherein, in the cyclone part, the inlet is disposed in a direction perpendicular to a longitudinal axis of the suction portion.

13. The cleaner of claim 10, wherein the cyclone part is disposed below the suction portion.

14. The cleaner of claim 10, wherein the motor unit is disposed on a longitudinal axis of the suction portion.

15. The cleaner of claim 14, wherein a longitudinal axis of the motor unit crosses the longitudinal axis of the suction portion.

16. The cleaner of claim 10, wherein an inflow direction of air introduced into the motor unit is parallel to a longitudinal axis of the suction portion.

17. The cleaner of claim 10, wherein a discharge direction of air discharged from the cyclone part is parallel to a longitudinal axis of the suction portion.

18. The cleaner of claim 1, wherein the housing further comprises:
a handle which is disposed behind the filter; and
a power supply unit which is disposed on one side of the handle,
wherein the motor unit is disposed opposite to the power supply unit with respect to the handle.

19. The cleaner of claim 18, wherein a center of gravity of the motor unit and a center of gravity of the power supply unit are disposed symmetrically with respect to the handle.

20. The cleaner of claim 18, wherein an upper portion of the handle is disposed in front of a center of gravity of the motor unit, and a lower portion of the handle is disposed behind a center of gravity of the power supply unit.

21. The cleaner of claim 1, wherein a flow of the air flowing within the cleaner comprises at least one bending point at which a flow direction of the air is changed from a front-rear direction to an up and down direction.

* * * * *